United States Patent Office 3,357,979
Patented Dec. 12, 1967

3,357,979
PROCESS IMPROVEMENT FOR PREPARING CYANURIC ACID
Eugene C. Sobocinski, Hazelwood, and William F. Symes, Webster Groves, Mo., assignors to Monsanto Company, St. Louis, Mo., a corporation of Delaware
No Drawing. Filed Oct. 1, 1965, Ser. No. 492,280
10 Claims. (Cl. 260—248)

The present invention relates to a process for controlling the particle size of and preparing substantially pure cyanuric acid, and more particularly relates to novel processes for the preparation of a chemical grade, substantially pure or pure, cyanuric acid which is characterized by having a particle size distribution such that less than 20% by weight of the cyanuric acid particles will pass through a No. 200 mesh U.S. Standard screen.

The prior art has generally recognized the problem of the need of preparing substantially pure cyanuric acid as noted in the discussion of said art hereinafter set forth.

Cyanuric acid may be prepared by a variety of procedures, the most common of which is to merely melt and heat, e.g. pyrolyze, urea at atmospheric pressure above the temperature range at which urea decomposes (e.g. 180–250° C.) in accordance with the following reaction:

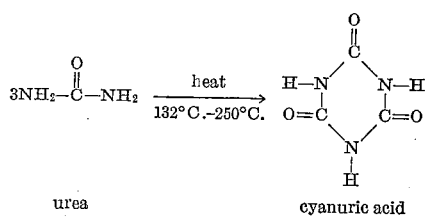

However, when urea is heated at these temperatures, this reaction is not the only reaction which occurs. When urea per se is heated to temperatures above the melting point for relatively short periods of time, it may also, and usually does, partially volatilize, isomerize to ammonium cyanate, decompose into ammonia, water and carbon dioxide, and polymerize to produce a range of products in addition to and mixed with cyanuric acid. Such products include ammelide, ammeline, melamine, biuret, triuret and dicyandiamide. Other products which may be formed during the pyrolysis of urea include ammonium carbonate and cyanic acid and polymers of cyanic acid. The final product thus formed is an impure reaction product containing cyanuric acid and substantial quantities of at least one, and usually two or more, of the above-mentioned impurities intermixed therewith.

It has also been proposed to add ammonium chloride or zinc chloride as catalyst to the urea during heating to increase the yields of cyanuric acid and to reduce, to a certain extent, the secondary reaction thereby decreasing the quantities of the impurities formed therewith. Such procedures result in a cyanuric acid product which contains reduced amounts of the aforementioned impurities, but the cyanuric acid nevertheless is impure and also contains the catalyst as an additional impurity.

Generally speaking, the pyrolysis of urea to cyanuric acid results in an impure reaction product which is difficult to purify even after it has been partially purified by previously known methods. The cyanuric acid obtained usually contains from 1.0 to more than 2% by weight of residual impurities such as amides or amines of cyanuric acid, for example, ammelide, ammeline and melamine, biuret and ammonium salts, for example, ammonium cyanate and/or ammonium chloride.

It has been proposed heretofore in U.S. Patent 2,943,088, issued June 28, 1960, to Richard Howard Westfall, to purify cyanuric acid by subjecting impure cyanuric acid, prepared by heating urea in a kiln, to digestion with certain concentrations of aqueous sulfuric acid under certain specific conditions referred to in the patent.

U.S. Patent 3,172,886, issued Mar. 9, 1965, to I. Christoffel et al., discloses a method of preparing cyanuric acid by the pyrolysis of urea in an inert liquid medium, such as a liquid high boiling hydrocarbon, and the subsequent purification of the resultant crude cyanuric acid by the leaching thereof with an aqueous ammonia solution. The cyanuric acid dissolves in the aqueous ammonia solution and the impurities remain undissolved and are subsequently separated from such solution. Thereafter, the purified solution is contacted with a mineral acid in order to substantially neutralize the ammonia therein. The cyanuric acid product is then recovered from the acidulated liquor by cooling said liquor and separating said product therefrom.

The purification processes described in the aforementioned patents possess certain disadvantages. With reference to the Westfall patent, one disadvantage arises in that large quantities of acid are required to effect the digestion of a given amount of impure cyanuric acid. Thus, when standard metal equipment such as stainless steel equipment is employed in the digestion process substantial corrosion of the metal occurs which results in the metal contamination of the cyanuric acid and this consequently necessitates uneconomic periodic replacement of the digestion equipment or the use of relatively expensive glass-lined digestion equipment. Another disadvantage of both the Westfall and Christoffel processes is that the final cyanuric acid product obtained is not ammonia free and often contains more than 0.5% by weight of ammelide and/or ammonia in the form of ammonia salts and one or more of the other impurities hereinbefore referred to. Cyanuric acid obtained from such processes may be employed for many uses, such as, for example, as a source of nitrogen in fertilizing or as a chemical intermediate in the preparation of certain compounds. However, when cyanuric acid containing impurities such as ammonia or its salts or other impurities such as ammelide is employed in the manufacture of chlorocyanuric acids and salts thereof, the presence of even small amounts of such impurities usually results in the formation of noxious and hazardous volatile chloroamines such as $NHCl_2$ and/or $NCl_3$.

Another disadvantage in the aforementioned processes of Westfall and Christoffel is that color-causing impurities tend to form in the chlorinated cyanuric acids prepared from the impure cyanuric acid, hereinbefore referred to, and such chlorinated cyanuric acids or salts thereof tend to have a pale yellow to tan color which has been deemed objectionable from an esthetic point of view when these compounds are utilized, for example, in swimming pool applications. Furthermore, when dry purified cyanuric acid is used to make derivatives thereof, various processing problems have arisen which normally have required additional processing, i.e. purification, of such derivatives to produce an essentially colorless (white) product or a product with an unobjectionable color.

Another disadvantage in the prior art processes hereinbefore referred to is that the particle size of the "semipurified" cyanuric acid is very small, i.e. substantially all of the particles pass through a No. 200 mesh U.S. Standard screen, which retards the efficient production of pure cyanuric acid and yields a product particle size distribution which inhibits to some extent the preparation of cyanuric acid derivatives therefrom. This facet in the production of pure cyanuric acid has been completely overlooked by the prior art which has not recognized the importance of producing pure cyanuric acid having a good particle size, i.e. a particle size such that less than 20% by weight of the particles pass through a No. 200 mesh U.S. Standard screen.

The aforementioned disadvantages are overcome by the practice of the novel process of the present invention which yields a substantially pure or pure (chemical grade) cyanuric acid which is characterized by exhibiting an improved color, i.e. is essentially colorless or white, has an extremely low concentration of impurities, i.e. 0.5% or less such as ammelide and/or ammeline, and has a larger average particle size than has been attained heretofore. In accordance, then, with the present invention, it has unexpectedly been found possible to prepare pure (chemical grade) cyanuric acid having the aforementioned characteristics, which has heretofore not been obtainable by prior art processes on a large scale.

Therefore, it is one object of the present invention to provide novel processes for preparing substantially pure or pure cyanuric acid.

It is also an object of this invention to provide novel processes for producing purified cyanuric acid substantially free of color-producing bodies and/or other impurities.

It is a further object of the present invention to provide an improved and novel process for preparing substantially pure or pure cyanuric acid having improved color and which is further characterized by having a particle size distribution such that less than 20% by weight of the cyanuric acid particles will pass through a No. 200 mesh U.S. Standard screen.

Additional objects and advantages of the present invention will become apparent from the following description and the appended claims.

In accordance with the processes of the present invention, it has been unexpectedly ascertained and discovered that if, impure cyanuric acid, for example cyanuric acid obtained by the pyrolysis of urea and subjected to acid hydrolysis to remove at least 80% of the impurities therein, is treated by the novel process of the present invention, the aforementioned desired characteristics will be obtained. Specifically this novel process comprises, in general, the following steps: First, admixing an aqueous solution, containing such impure cyanuric acid, and an aqueous alkali metal hydroxide solution together to form a di-alkali metal cyanurate solution. Second, contacting the cyanurate solution with carbon (preferably active or absorbent carbon) and removing such carbon after a period of time sufficient to remove essentially all of the color-forming impurities from such solution. Third, feeding the cyanurate solution and an aqueous solution of a mineral acid into an acidic water heel, maintained at a temperature greater than 20° C. (preferably 25° C. to 50° C.), at a rate sufficient to form a slurry of water and essentially insoluble cyanuric acid particles having a particle size distribution such that less than 20% by weight of the particles thereof will pass through a No. 200 mesh U.S. Standard screen. Such acid addition rate is preferably sufficient to maintain the heel and the resultant slurry at a pH of from about 0.75 to about 3.0.

Fourth, separating the cyanuric acid particles from the bulk of the water in such slurry. At this point, the pure or substantially pure cyanuric acid particles may be utilized as such; or, if it is desired to store them or ship to a customer, said particles may then be treated to remove the bulk of the residual mineral acid therein and subsequently dried. As pointed out hereinafter, the removal of the acid and the drying of said particles are not essential steps in the novel process of the present invention.

As set forth in the introductory part of the present application, crude cyanuric acid can be prepared by a variety of procedures and the product (crude cyanuric acid) of any of these procedures can be utilized in the novel process of this invention and are considered within the scope of the present invention. Furthermore, crude cyanuric acid, which may be prepared by any method known or obvious to the art, can be used and is considered within the scope of this invention. For the purposes of the novel process description herein and as an example only with no limitations intended, the invention is more particularly described with reference to the use of crude cyanuric acid which has been prepared by the pyrolysis of urea. This crude cyanuric acid generally contains from about 70 to 82% by weight of cyanuric acid and from about 30 to about 18% by weight of impurities such as ammelide and/or ammeline, and also small, but significant, amounts of other organic compounds (other than the aforementioned) which form or result in the formation of color bodies. The foregoing analyses of such crude cyanuric acid is merely exemplary and is not to be considered as limitative. It is known in the art (see the Westfall patent hereinbefore referred to) that this crude cyanuric acid can be converted to partially purified cyanuric acid, that is, the ammelide and/or ammeline impurities can be reduced somewhat by the acid hydrolysis of the crude cyanuric acid in water to yield a product which contains from about 98 to about 98.5% cyanuric acid and from about 1.5 to about 2% or more of ammelide and/or ammeline and such other organic compounds. Such partially purified product is sometimes hereinafter referred to as a "technical grade" cyanuric acid.

In accordance, then, with the novel processes of the present invention, the partially purified or technical grade cyanuric acid may be substantially completely purified to a "chemical grade" or essentially pure product which is further characterized by having a whiteness of color, as hereinafter defined, and a particle size distribution, such that less than 20% by weight of the particle passes through a No. 200 mesh U.S. Standard screen.

In a preferred embodiment of the present invention, an aqueous slurry containing cyanuric acid is prepared by mixing together technical grade cyanuric acid, as hereinbefore defined, with water. This slurry usually comprises from about 1% to about 40%, preferably from about 25% to 35%, by weight of such technical grade cyanuric acid. The slurrry of cyanuric acid and an aqueous alkali metal hydroxide solution are then mixed together at a temperature less than 50° C., preferably from about 30 to about 40° C., to form a di-alkali metal cyanurate solution, that is, the hereinafter referred to feed solution.

Any of the alkali metal hydroxides may be utilized. However, it is preferred to use either sodium hydroxide or potassium hydroxide, such hydroxide being utilized in the form of an aqueous solution having a pH above 9, preferably between pH 12 and 14, i.e. a 50% solution. The amount of the aqueous alkali metal hydroxide solution fed into the reaction vessel containing the slurry of cyanuric acid usually is sufficient to yield, after all the additions of said hydroxide solution have been made, a mol ratio of alkali metal hydroxide to cyanuric acid of from about 2.2:1 to about 2.3:1. It is important that this mol ratio be maintained in order to provide a clear solution and prevent any appreciable loss of cyanuric acid in the novel process of the present invention. Furthermore, it has been ascertained that a non-clear cyanurate feed solution impedes the removal of the color-causing impurities therefrom when undergoing a subsequent carbon treatment as hereinafter described. The reason for this particular phenomenon is not readily understood; however, it was observed in conducting the experiments described herein.

Since the di-alkali metal cyanurate solution contains color-causing impurities, these are removed by the addition of carbon, preferably a powdered activated carbon, and the subsequent removal of the carbon therefrom, after a sufficient contact time, the carbon appears to effect the absorption and/or removal of the color-causing impurities therein. The di-alkali metal cyanurate solution may be passed through a mass of porous carbon, preferably an activated carbon bed (if conducted on a continuous basis). If the treatment is batchwise, as described above, particles of the carbon may be added to the cyanurate solution with agitation and separated therefrom after sufficient contact time to remove the color-causing impurities therefrom.

The granular activated carbon, used in the subsequent examples set forth in the present application, was made from lignite, which, after activation with heat and steam, was thoroughly washed with mineral acids and then with water to remove extractable inorganic constituents, and is the type commerically available under the trademark Darco S–51 powdered activated carbon. One of the critical physical properties of this activated carbon is its total surface area which is directly proportional to the absorption capacity. The total surface area of the Darco powdered carbon, which was found to be most successful in removing the color-causing impurities from the cyanurate solution, is approximately 1300 m.$^2$/g. (square meters per gram) as determined by the nitrogen absorption method described by Brunauer, Emmett and Teller in the "Journal of the American Chemical Society," volume 60, page 309, and published in 1938. It should also be noted that utilization of the activated carbon did not produce or result in any significant pH changes in the cyanurate solution being treated. It is preferred to use the Darco brand powdered activated carbon in removing the color causing impurities from the aforementioned solution. While porous, powdered, activated carbon was utilized in the examples of the present invention, other types or forms of carbon, i.e., carbon black, lampblack, bone black, etc., which have absorption characteristics similar thereto may be used and are within the scope of the present invention. It is preferred to use an activated carbon having a surface area of about 200 to about 1500 square meters per gram. The particular method, as described hereinafter, of contacting the activated carbon with the di-alkali metal cyanurate solution is not considered a limiting factor of this invention. The batchwise process and the continuous process of treating the cyanurate solution with carbon are, then, both contemplated as being within the scope of the present invention.

The amount of carbon (preferably powdered activated carbon) which is added to the di-alkali metal cyanurate solution is preferably within the range of from 0.1% to about 0.3% by weight (dry basis) of the total "cyanuric acid" in the di-alkali metal cyanurate solution.

If the subsequent separation or removal of the carbon from the di-alkali metal cyanurate solution is to be effected or carried out by filtration when a batchwise process is utilized, then it is also within the scope of the present invention to incorporate or add a filter aid such as Dicalite 4200 diatomaceous earth. Other types of filter aids may be used; however, it is important that the filter aid which is used in conjunction with the present invention be limited to a filter aid which does not contain caustic material or matter which is soluble in said solution and which may possibly yield color and/or other undesired impurities which would impede obtaining the desired end (chemical grade) product. The amount of a filter aid which is added to the carbon-containing alkali metal cyanurate solution is preferably from about 0.3% to about 0.6% by weight (dry basis) of the total "cyanuric acid" in the alkali metal cyanurate solution. It is important to note that the addition of a filter aid is not necessary in the processes of the present invention and that other means of removing the carbon from the di-alkali metal cyanurate solution can be affected, such as by centrifuging and decanting, etc.

After the sequential addition of the aforementioned materials into a reaction vessel, the resultant solution is then agitated for a period of from about 5 minutes to about 5 hours or longer and more preferably from about 5 minutes to about 30 minutes in order to insure an adequate and/or complete formation of the di-alkali metal cyanurate material and also to achieve an adequate dispersion of the carbon and filter aid in the overall resulting mixture. As previously pointed out, it is desirable to have an excess of the alkali metal hydroxide solution, i.e., mol ratio (M.R.) alkali metal hydroxide to cyanuric acid being within the range of about 2.2:1 to about 2.3:1, which helps to achieve a clear solution of the above-mentioned mixture and also prevents appreciable or significant loss of any of the cyanuric acid in the overall process.

After the resulting solution has been thoroughly agitated over a period of time, as heretofore defined, which insures a sufficient contact between all of the ingredients contained therein, the slurry or resultant solution is then filtered by various means which are well known in the art. The insoluble materials removed by filtration contain essentially all of the color-causing impurities.

The next step in the novel process of the present invention and which constitutes one of the most critical aspects or features thereof, entails the controlled feeding of the di-alkali metal cyanurate solution into an acidic water heel. In this step, the heel and resultant solution or slurry are maintained at a pH level and temperature range as hereinafter described. The acidic heel can be prepared by admixing a predetermined amount of water, in a vessel or container, with a mineral acid in amounts sufficient to yield an acidic aqueous heel having a pH of from about 0.75 to about 3.0, and preferably from about 1 to about 2.5. The amount of water utilized in the heel is predetermined and usually constitutess from about 20% to about 40% by weight of the batch feed solution which is subsequently to be treated, i.e., the di-alkali metal cyanurate solution. While this part of the invention is described with reference to a batchwise process, it is also within the scope of the present invention to carry out this critical aspect of the present invention on a continuous basis, for example, as hereinafter described. It is important that the pH of the acidic water heel and the resultant solution or slurry be maintained within the above-described pH limits throughout the entire addition of the di-alkali metal cyanurate solution since this factor affects the desired end results. The pH range is maintained, if necessary, by the addition to the heel of an aqueous solution of a mineral acid as more specifically described hereinafter.

Almost any mineral acid may be employed in the aqueous solution of a mineral acid used in the reaction vessel to keep the acidic water heel within the aforementioned pH ranges. Examples of mineral acids which have been found especially suitable include phosphoric, nitric, hydrobromic, hydrochloric and sulfuric acids. Of these, hydrochloric and sulfuric acids are preferred, and sulfuric acid is particularly preferred. The preferred sulfuric acid solutions, utilized for this purpose, have a $H_2SO_4$ concentration of from about 60% to 93% by weight.

As previously pointed out, one of the critical aspects of the present invention is in the controlled feeding of the feed solution, that is, the di-alkali metal cyanurate solution, into a reaction vessel which contains an acidic water heel having a pH within the forementioned range. With more particular reference to the feed solution, it is desirable to use a feed solution containing at least 50% water and more preferably from about 75 to 85% water. The feed solution and the aqueous mineral acid should be fed to the acidic water heel in a reaction vessel at a rate sufficient to maintain the resultant slurry within the aforementioned pH limits in order to produce substantially completely pure cyanuric acid particles wherein the particle size distribution is such that less than 20% of said particles pass through a No. 200 mesh U.S. Standard screen.

The acidic water heel and the resultant slurry are maintained at a temperature greater than 20° C. and preferably at a temperature from about 30° C. to about 50° C. In order to achieve this temperature limitation, it may be necessary to cool the acidic water heel or resultant slurry with, for example, an ice bath. Utilization of other cooling or heat exchange means are also considered within the scope of the present invention.

With more particular reference to the controlled feeding of the feed cyanurate solution, it has been ascertained, for example, from the laboratory experiments hereinafter set forth that at a feed rate of from about 5 to about 30 grams per minute (based on an initial feed solution weight of 1000 grams), more preferably from about 10 to about 20 grams per minute, the above-described desired end results can be obtained. By the same token, it may be necessary to "scale up" the aforementioned (laboratory basis) feed rate in order to carry out the novel process of the instant invention on a commercial basis. Stated differently, the, and for example, it has been ascertained that a feed rate of from about 0.5% to about 3% by weight, of the total weight of the feed solution (e.g. 1,000 lbs.), per minute is equivalent to the aforementioned feed rate limits. It is to be noted, however, that the aforementioned are merely examples and that the most critical limitation is that the feed rate (whatever it may be) should be controlled so as to produce cyanuric acid particles having the above-described particle size limitations.

The aforementioned feed rate not only has an effect on the cyanuric acid particle size, but it also has, to some extent, an effect on the successful removal of a substantial portion of the ammelide and/or ammeline impurities from the freshly precipitated cyanuric acid particles. Specifically, it is believed that the said impurities remain soluble in the aforedefined resultant slurry as the feed solution is controllably fed thereto and only substantially completely pure cyanuric acid particles are precipitated out of solution in the acidic heel. The foregoing is merely an idea as to what may happen and the applicant does not wish to be limited in his invention to this explanation.

As mentioned heretofore, this novel aspect of the process of the present invention can be carried out on a continuous basis instead of a batchwise process. Illustrative of equipment useful in such a continuous process is a reaction vessel comprising a conical shaped container having positioned therein a screw conveyor extending completely to the bottom portion or apex thereof. In operation, the feed (cyanurate) solution and mineral acid are fed into said vessel at a point about midway between the top and bottom portions thereof. The purified, freshly precipitated cyanuric acid particles fall or gravitate to the bottom of the slurry formed in such vessel at which point the screw conveyor continuously withdraws such particles from the slurry or vessel. The liquid, or remaining solution, is then decanted by merely allowing said solution to overflow from the top of the vessel into a trough or out through an exit means and subsequently recirculated to and through the earlier steps of the novel process. The feed solution and mineral acid being injected into the reaction vessel are incorporated therein or admixed at a point beneath the surface in order to insure that the feed solution is not decanted from the vessel and that a reaction takes place in the vessel sufficiently below the overflow to permit a substantially complete reaction and settling of cyanuric acid particles. It is also within the scope of the present invention to agitate the contents of the vessel when using either the batchwise or continuous methods.

When the aforementioned process is carried out, it has been determined that the cyanuric acid produced therefrom contains 0.5% or less by weight, based on the dry purified cyanuric acid, impurities and has a particle size distribution such that substantially less than 20% by weight of said particles pass through a No. 200 mesh U.S. Standard screen.

The freshly precipitated and substantially pure cyanuric acid particles (in the hydrated form) which have been recovered from the last-mentioned step are then removed from the liquid slurry by means well known in the art, such as filtration, decantation, and centrifugation, and such particles may then be washed and dried. It should be noted that the cyanuric acid need not be dried but may be utilized directly in the manufacture of other chemicals in the water wet condition. If drying of the substantially pure cyanuric acid particles is desired, a drying temperature of from about 100° C. to about 150° C. can be used to produce the desired end product.

A further understanding of the processes of this invention will be obtained from the following specific examples which are intended to illustrate the invention, but not to limit the scope thereof, parts and percentages being by weight unless otherwise specified.

EXAMPLE 1

A series of four batch runs were made using about 1,000 grams of the feed solution, i.e. dipotassiumcyanurate solution, for each run. The feed solution was prepared by reacting potassium hydroxide and cyanuric acid which contained 1.4–1.5% by weight, based on the total weight of dry cyanuric acid, of ammelide, at a temperature of 35° C. to produce a dipotassiumcyanurate solution containing from about 9 to about 10% cyanuric acid and having a molar ratio of KOH to cyanuric acid of about 2.2:1 to about 2.3:1. To the dipotassiumcyanurate feed solution was added approximately 0.3% by weight, based on the total weight of cyanuric acid, of Darco activated carbon, and 0.6% by weight, based on the total weight of cyanuric acid, of Dicalite 4200 diatomaceous earth filter aid. The resultant solution was agitated for approximately 15 minutes and filtered. This solution, which was clear, was added to an acidic water heel which had a different pH in each of the four batch runs, i.e., the pH of the four different heels used being 1.0, 1.5, 2.0 and 2.5, respectively, in runs 1 through 4. The pH of the initial acidic water heel was maintained at a constant level by the addition of a 60% (by weight) sulfuric acid solution during the controlled addition of the dipotassiumcyanurate feed solution to each water heel. The results of the four batch runs utilizing 1,000 grams of dipotassiumcyanurate feed solution in each run are set forth in the attached Table 1. After the desired amount of feed solution was added, the resulting slurry of precipitated cyanuric acid was then filtered on a Buchner filter, washed with two 1,000 cc. doses of 35° C. water, dried in an oven at 110° C., and then the dried purified cyanuric acid was then analyzed for particle size and impurity content. The color of the end product was measured by a light reflectance means using a white magnesium oxide base, which was equivalent to 100, as a standard for comparison.

As can readily be seen from Table 1, the weight percent of the purified cyanuric acid particles passing through a 200 U.S. Standard mesh screen was always considerably less than 20% even when the pH level of the initial water heel or resultant mixture ranged from .99 to about 2.55. Furthermore, it should be noted that the impurity content of the purified cyanuric acid was as low as 0.2% ammelide and/or ammeline as compared with the original ammelide impurity of 1.4–1.5% in the starting cyanuric acid.

TABLE 1

| Run | Time, Min. | Initial Water Heel or Resultant Mixture | | H₂SO₄ Added, cc. | Feed Remaining | U.S. Standard Mesh Screen Analyses of Purified Cyanuric Acid, percent | | | | | | | Impurity Content [1] of Purified Cyanuric Acid, percent by weight | Purified Cyanuric Acid Color [2] |
|---|---|---|---|---|---|---|---|---|---|---|---|---|---|---|
| | | Temp., °C. | pH | | | +20 | −20 +40 | −40 +60 | −60 +100 | −100 +140 | −140 +200 | −200 | | |
| 1 | 0 | 36.0 | [3]1.00 | 0 | [4]1,000 | | | | | | | | | |
| | 2 | 35.0 | 1.00 | 4 | 975 | | | | | | | | | |
| | 16 | 35.8 | 0.98 | 28 | 825 | | | | | | | | | |
| | 30 | 35.0 | 0.99 | 53 | 660 | | | | | | | | | |
| | 46 | 35.7 | 1.00 | 78 | 475 | | | | | | | | | |
| | 61 | 34.9 | 1.00 | 105 | 300 | | | | | | | | | |
| | 75 | 35.1 | 1.02 | 125 | 150 | | | | | | | | | |
| | 90 | 34.6 | 1.00 | [5]152 | 0 | | | 5.6 | 68.2 | 18.8 | 5.4 | 2.0 | 0.2 | 95 |
| 2 | 0 | 35.0 | [6]1.50 | 0 | [4]1,000 | | | | | | | | | |
| | 8 | 35.0 | 1.50 | 13 | 815 | | | | | | | | | |
| | 16 | 34.5 | 1.52 | 26 | 630 | | | | | | | | | |
| | 24 | 35.3 | 1.49 | 39 | 440 | | | | | | | | | |
| | 32 | 34.6 | 1.49 | 51 | 250 | | | | | | | | | |
| | 40 | 34.6 | 1.49 | [5]63 | 60 | | Trace | 0.1 | 33.5 | 47.9 | 15.0 | 3.5 | 0.47 | 93 |
| 3 | 0 | 35.0 | 2.00 | 0 | [4]1,000 | | | | | | | | | |
| | 8 | 35.0 | 2.08 | 11 | 815 | | | | | | | | | |
| | 17 | 34.2 | 2.02 | 23 | 610 | | | | | | | | | |
| | 24 | 35.0 | 2.00 | 34 | 445 | | | | | | | | | |
| | 32 | 35.0 | 2.00 | 44 | 250 | | | | | | | | | |
| | 40 | 34.5 | 2.00 | [5]55 | 75 | | do | Trace | 32.3 | 48.1 | 18.0 | 1.6 | 0.50 | 92 |
| 4 | 0 | 33.0 | [7]2.50 | 0 | [4]1,000 | | | | | | | | | |
| | 6 | 33.0 | 2.30 | 6 | 940 | | | | | | | | | |
| | 15 | 33.5 | 2.50 | 16 | 845 | | | | | | | | | |
| | 30 | 33.5 | 2.50 | 32 | 675 | | | | | | | | | |
| | 40 | 34.2 | 2.55 | 44 | 550 | | | | | | | | | |
| | 50 | 35.0 | 2.40 | 57 | 440 | | | | | | | | | |
| | 71 | 34.0 | 2.40 | 79 | 210 | | | | | | | | | |
| | 90 | 35.0 | 2.45 | [5]100 | 0 | | do | 63.0 | 28.0 | 2.0 | 4.0 | 2.0 | 0.4 | 90 |

[1] Initial Impurity content 1.4–1.5%.
[2] Light reflectance test—MgO=100; Purified cyanuric acid=95; Starting cyanuric acid=75.
[3] 400 cc. acidified water heel.
[4] Dipotassium cyanurate solution.
[5] 60% H₂SO₄ used.
[6] 300 cc. acidified water heel.
[7] 500 cc. acidified water heel.

A fifth batch run was undertaken in the same manner as heretofore described in the above four batch runs. The only exception in this fifth run was that the Darco and Dicalite were not utilized in order to remove any color causing impurities. The results obtained from this fifth run were similar to the results shown in Table 1 with the exception that the color of the purified cyanuric acid was somewhat less in whiteness, the reflectance number averaged about 80 as compared to the 90–95 range of the cyanuric acid which was produced by the process incorporating the carbon treatment therein.

EXAMPLE 2

A second series of tests was conducted, this time on a continuous basis as compared to the batch runs set forth in Example 1. The second series was conducted over a period of 6 hours. Ten thousand cubic centimeters of dipotassiumcyanurate solution was prepared in a similar manner as set forth in Example 1 with the exception that the molar ratio of potassium hydroxide to cyanuric acid was approximately 2.3 and the resultant slurry contained 9.0% cyanuric acid which had an impurity content of 1.4% ammelide based on the dry weight of cyanuric acid. The operating conditions for this continuous run were an initial acidic water heel or resultant mixture pH of 1.5 (plus or minus 0.1), a temperature of the heel or mixture of 38.0 (plus or minus 2.0° C.), a dipotassiumcyanurate feed solution rate of 22 grams per minute, and (60% strength) sulfuric acid addition rate sufficient to maintain the aforementioned pH level. The results of this continuous run are set forth in Table 2. At the particular times indicated in Table 2, the solids produced were removed from the resultant mixture, washed, filtered and dried as set forth in Example 1 and analyzed for particle size, percent impurity and color. As can readily be seen from Table 2, the results obtained on a continuous basis were exceptionally good and were equivalent to those results obtained in conducting the novel and unique process of the present invention on a batchwise basis.

TABLE 2 (RUN NO. 5)

| Time, Min. | Initial Water Heel or Resultant Mixture | | H₂SO₄ Added, cc. (cumulative) | Feed Solution Remaining, gms. | Purified Cyanuric Acid | | | | | | | |
|---|---|---|---|---|---|---|---|---|---|---|---|---|
| | | | | | Particle Size U.S. Standard Mesh Screen Analyses, percent by weight | | | | | | Impurity Content, percent by weight (Initial Impurity content 1.40 [1]) | Color [2] |
| | Temp., °C. | pH | | | +40 | −40 +60 | −60 +100 | −100 +140 | −140 +200 | −200 | | |
| 0 | 39 | [3]1.50 | 0 | [4]10,000 | | | | | | | | |
| 10 | 39 | 1.50 | 14 | 9,770 | | | | | | | | |
| 30 | 40 | 1.50 | 41 | 9,310 | | | | | | | | |
| 60 | 40 | 1.52 | 81 | 8,620 | | | | | | | | |
| 75 | 40 | 1.51 | 102 | 8,310 | | 0.3 | 63.2 | 18.4 | 12.6 | 0.9 | 0.38 | 91 |
| 90 | 40.5 | 1.50 | 124 | 7,930 | | | | | | | | |
| 105 | 40 | 1.51 | 146 | 7,560 | Trace | 5.2 | 82.8 | 2.2 | 8.8 | 1.0 | 0.38 | 91 |
| 120 | 40.5 | 1.54 | 164 | 7,240 | | | | | | | | |
| 145 | 40.0 | 1.40 | 203 | 6,665 | Trace | 49.6 | 44.0 | 0.2 | 5.0 | 1.2 | 0.40 | 95 |
| 165 | 40.3 | 1.50 | 226 | 6,205 | | | | | | | | |
| 185 | 40 | 1.50 | 253 | 5,745 | 0.2 | 78.4 | 12.4 | Trace | 4.8 | 4.3 | 0.40 | 91 |
| 225 | 39.6 | 1.45 | 309 | 4,825 | 0.4 | 73.4 | 8.4 | 11.0 | 3.4 | 3.6 | 0.37 | 94 |
| 265 | 39.8 | 1.50 | 365 | 3,905 | 3.6 | 57.4 | 14.0 | 3.0 | 17.6 | 4.2 | 0.42 | 91 |
| 305 | 39.5 | 1.50 | 420 | 2,985 | 12.6 | 3.50 | 30.8 | 6.4 | 11.2 | 4.0 | 0.42 | 90 |
| 345 | 39.5 | 1.60 | 473 | 2,065 | 18.6 | 26.6 | 35.2 | 5.4 | 11.0 | 3.0 | 0.37 | 95 |
| 358 | 42.0 | 1.20 | 505 | 1,765 | | | | | | | | |
| 369 | 39.2 | 1.50 | 505 | [4]1,515 | 16.0 | 34.0 | 30.0 | 5.0 | 10.4 | 3.6 | 0.37 | 95 |

[1] Dipotassium cyanurate (M. R. KOH/cyanuric acid=2.3:1; 9% cyanuric acid; 1.4% ammelide-ammeline impurity content).
[2] Light reflectance test—MgO=100; Purified cyanuric acid=95; Starting cyanuric acid=75.
[3] 300 cc. acidifed water heel.
[4] Remaining feed solution feed at the same rate and the periodic analyses of the purified cyanuric acid was similar to that obtained at this point.

EXAMPLE 3

In order to more specifically demonstrate the important effect of the three variables, i.e. pH, temperature, and feed rate, on the desired end product, the experiments set forth in Examples 3 and 4 were carried out by a batchwise process similar to that described in Example 1.

In Example 3, a third series of runs were conducted at different temperatures in order to show the effect of temperature on the particle size of the purified cyanuric product. Three 1,000-gram batches of disodium cyanurate feed solution were prepared in a manner somewhat similar to that set forth in Example 1 except that the hydroxide solution utilized was sodium instead of potassium. The disodiumcyanurate solution was controllably fed, at a rate of 26 grams per minute, into a reaction vessel containing a 400 cc. acidified (by $H_2SO_4$) water heel having a pH of 1.5 which was maintained at this level throughout the test. The three batch runs in this series were conducted with the temperature of the heel being maintained, with the aid of an ice bath and/or cold water jacket, at 30, 35 and 40° C., respectively, for the three different runs. The data obtained from this third series of tests showed that the smallest amount of material passing through a 200 mesh U.S. Standard screen was obtained at a temperature of 40° C. Specifically the data is tabulated below. The effect of temperature on the impurity content, i.e. ammelide-ammeline, is also shown in the data set forth below.

PURIFIED CYANURIC ACID

| Run No. | Impurity Content,[1] Percent by weight | Particles Passing Through a No. 200 Mesh U.S. Standard Screen, Percent by weight | Slurry Temperature |
|---|---|---|---|
| 6 | .50 | 8.7 | 30 |
| 7 | .46 | 5.0 | 35 |
| 8 | .26 | 2.8 | 40 |

[1] 1.40 (Untreated cyanuric acid).

EXAMPLE 4

In order to demonstrate the effect of pH of the acidic water heel on the particle size and impurity content of the purified cyanuric acid, a fourth series of experiments, consisting of five runs, were carried out in a similar manner as set forth in Example 3. Five 1,000-gram samples of disodium cyanurate were prepared in a similar manner as set forth in Example 3. The five runs in this example were conducted at a constant slurry temperature of 35° C. and a constant feed rate of 26 grams per minute. The following data set forth the results of this fourth series of tests.

PURIFIED CYANURIC ACID

| Run No. | Impurity Content,[1] (Ammelide-Ammeline) Percent by weight | Particle Size Passing Through No. 200 Mesh U.S. Standard Screen, Percent by weight | Slurry pH |
|---|---|---|---|
| 9 | .28 | 17.5 | 1.0 |
| 10 | .31 | 3.6 | 1.5 |
| 11 | .30 | 1.9 | 2.0 |
| 12 | .38 | 1.4 | 2.5 |
| 13 | .46 | 1.0 | 3.0 |

[1] 1.40 (Untreated cyanuric acid).

It is to be noted in Run No. 1 that while the impurity content was significantly reduced, the weight percent of particles passing through a No. 200 mesh screen was 17.5% which is slightly higher than the other particle size numbers in Runs 10 through 13 but lower than the maximum (<20%). Example 4 was substantially repeated but with the express purpose of demonstrating the effect of feed rate on the purified cyanuric acid particle size. The conditions of this repeat example were slurry temperature—35° C.; pH—1.0; starting cyanuric acid impurity content—1.40%; and sufficient sulfuric acid fed to said slurry to maintain a pH level of 1.0 throughout each of the four runs. Four 1,000-gram samples of disodium cyanurate were fed into acidic water heels at 12, 26, 42 and 106 grams per minute, respectively. The resultant purified cyanuric acid showed an impurity content of about .42–.44% by weight; however, the particle size distribution showed that the percent by weight passing through a No. 200 mesh U.S. Standard screen was 2.0%, 17.5%, 22.0% and 25.6%, respectively, at the feed rates of 12, 26, 42 and 106 gms./min. Consequently it can readily be seen then, that at each pH level, slurry temperature and cyanurate feed rate, all of these variables must be within certain limits (heretofore set forth) in order to obtain a product having the desired characteristics.

Remarks

From the foregoing Examples 1 through 4, it can readily be seen that the variables, i.e., pH, temperature, and feed rate, are very critical in obtaining the desired end result which is a purified cyanuric acid having whiteness in color, a low impurity content, and a particle size distribution such that less than 20% of the material passes through a No. 200 mesh U.S. Standard screen. Another variable which would have an effect on the desired end product is the initial impurity content, ammelide and/or ammeline, etc. of the crude cyanuric acid being processed. (It is to be noted that the cyanuric acid utilized in the aforementioned examples contained an impurity content of about 1.4% by weight thereof.) An additional test was made utilizing crude cyanuric acid containing 3.1% by weight ammelide and/or ammeline. It was found from this test that a lower pH (1.0 plus or minus 0.1) and a lower feed rate (12–17 grams per minute) were necessary in order to achieve a satisfactory assay without adversely effecting the desired particle size. In other words and stated differently, it was necessary to utilize the aforementioned conditions in order to achieve the desired level of impurity content in the final end product. On the other hand, a feed solution was prepared from cyanuric acid analyzing 0.35% ammelide and/or ammeline and an additional test run under the same conditions as set forth in Example 2, i.e., pH 1.5 (plus or minus 0.1), temperature 38.0 (plus or minus 2.0° C.), feed rate 22 grams per minute, and a sulfuric acid additional rate sufficient to maintain the desired pH of the slurry. This run resulted in a purified cyanuric acid which analyzed 0.034% ammelide and/or ammeline and had a particle size distribution such that only 4% of the total weight of a sample material passed through a No. 200 mesh U.S. Standard screen.

While the particular embodiments of the present invention have been shown and described specifically in the examples heretofore set forth, it will be obvious to those skilled in the art that changes and modifications may be made without departing from this invention in its broader aspects.

What is claimed is:

1. A process for preparing substantially pure cyanuric acid which comprises the steps of admixing an aqueous solution containing crude cyanuric acid with an aqueous alkali metal hydroxide solution to form a di-alkali metal cyanurate solution; contacting said cyanurate solution with carbon; removing said carbon from said cyanurate solution; feeding said cyanurate solution and an aqueous solution of a mineral acid into an acidic water heel, maintained at a temperature greater than 20° C., at a rate sufficient to form cyanuric acid particles having a particle size distribution such that less than 20% by weight thereof will pass through a No. 200 mesh U.S. Standard screen; and separating said cyanuric acid particles from the resultant solution, said acid addition rate being sufficient to maintain the heel and resultant slurry at a pH of from about 0.75 to about 3.0.

2. The process of claim 1 wherein the mineral acid is hydrochloric acid.

3. The process of claim 1 wherein the mineral acid is sulfuric acid.

4. The process of claim 1 wherein a filter aid is added to the di-alkali metal cyanurate solution which is subsequently filtered, whereby color-causing impurities contained therein are substantially removed prior to feeding said solution into the acidic water heel.

5. In a process for controlling the particle size of and preparing substantially pure cyanuric acid of improved color and low impurity content from technical grade cyanuric acid which has been obtained by pyrolyzing urea to form crude cyanuric acid and thereafter the acid hydrolyzed to reduce the quantity of impurities contained therein, the improvement which comprises the steps of (1) adding a sufficient quantity of an aqueous alkali metal hydroxide solution to an aqueous slurry of said technical grade cyanuric acid to form a di-alkali metal cyanurate solution wherein the mol ratio of the alkali metal hydroxide to cyanuric acid is within the range of from about 2.2:1 to about 2.3:1 and the water content is in excess of 50% by weight of the total weight of said solution; (2) adding a quantity of activated carbon which is equivalent to from about 0.1% to about 0.3% by weight based on the total weight of said crude cyanuric acid, and a quantity of filter aid which is equivalent to from about 0.3% to about 0.6% by weight based on the total weight of said crude cyanuric acid, to the said di-alkali metal cyanurate solution; (3) filtering the said di-alkali metal cyanurate solution whereby color-causing impurities are substantially removed therefrom; (4) concurrently controllably feeding the filtered di-alkali metal cyanurate solution and an aqueous solution of a mineral acid, into an acidic water heel, the temperature of said heel being constantly maintained between the range of from about 30° C. to about 50° C., the cyanurate addition rate being such that pure cyanuric acid particles are formed therein having a particle size distribution such that at least 80% by weight thereof will be retained on a No. 200 mesh U.S. Standard screen, and the rate of addition of said solution of a mineral acid being such that the resulting slurry has a pH in the range between 0.75 and 3.0; and (5) separating said cyanuric acid particles from the mixture of the said di-alkali metal cyanurate and said mineral acid solution and heel.

6. The process of claim 5 wherein the alkali metal hydroxide is selected from the group consisting of sodium hydroxide and potassium hydroxide, and the mineral acid is sulfuric acid.

7. The process of claim 6 and the additional step of agitating the di-alkali metal cyanurate solution, containing the activated carbon and filter aid, for a period of from about 5 to about 30 minutes prior to filtering said solution.

8. The process of claim 6 wherein the amount of the acidic water heel is from about 20% to about 40% by weight of the total weight of said filtered di-alkali metal cyanurate feed solution.

9. A process for the manufacture of substantially pure cyanuric acid of improved color, low impurity content, and being further characterized by having a particle size whereby less than 20% by weight of said particles will pass through a No. 200 mesh U.S. Standard screen, which comprises the steps of (1) adding a sufficient quantity of sodium hydroxide solution to an aqueous hydrolyzed cyanuric acid solution to form a di-sodium cyanurate solution wherein the mol ratio of the sodium hydroxide to cyanuric acid is within the range of from about 2.2:1 to about 2.3:1 and the water content is in excess of 50% by weight of the total weight of said solution; (2) adding a quantity of activated carbon, which is equivalent to from about 0.1% to about 0.3% by weight based on the total dry weight of the cyanuric acid in said cyanurate solution, and a quantity of filter aid, which is equivalent to from about 0.3% to about 0.6% by weight based on the total dry weight of the cyanuric acid in said cyanurate solution, to the said di-sodium cyanurate solution; (3) agitating the di-sodium cyanurate solution, containing the activated carbon and filter aid, for a period of from about 5 to about 30 minutes prior to filtering said solution; (4) filtering the said di-sodium cyanurate solution whereby color-causing impurities are substantially removed therefrom; (5) concurrently controllably feeding the filtered di-sodium cyanurate solution and an aqueous sulfuric acid solution into an acidic water heel, which is from about 20% to about 40% by weight of the total weight of said filtered di-sodium cyanurate feed solution, the temperature of said heel including the feed solution additions made thereto being constantly maintained at a temperature of about 30 to 40° C., the cyanurate addition rate being such that pure cyanuric acid particles are formed therein and have a particle size distribution such that at least 80% by weight thereof will be retained on a No. 200 mesh U.S. Standard screen, and the rate of addition of said sulfuric acid solution being such that the resultant slurry has a pH in the range between 1.0 and 2.5; (6) removing said cyanuric acid particles from the resultant slurry; and (7) drying the freshly precipitated, hydrated cyanuric acid particles at a temperature in excess of 100° C.

10. The process as set forth in claim 9 wherein the carbon is powdered and has a total surface area of from about 200 to about 1500 square meters per gram.

References Cited

UNITED STATES PATENTS

| | | | |
|---|---|---|---|
| 2,744,938 | 5/1956 | Urban | 260—708 X |
| 3,236,845 | 2/1966 | Baskin | 260—248 |

WALTER A. MODANCE, *Primary Examiner.*

JOHN M. FORD, *Assistant Examiner.*